United States Patent Office 3,258,429
Patented June 28, 1966

3,258,429
DECONTAMINATION SOLUTION AND METHOD
Ronald D. Weed, Richland, Wash., assignor to the United States of America as represented by the United States Atomic Energy Commission
No Drawing. Filed Sept. 19, 1963, Ser. No. 310,176
7 Claims. (Cl. 252—301.1)

The invention described herein was made in the course of, or under, a contract with the United States Atomic Energy Commission.

The invention relates to a novel decontamination solution, and to a method of decontaminating liquid-containing systems of nuclear reactors employing the same. More particularly, the invention relates to a solution suitable for, and to a method of, decontaminating aqueous moderator and coolant circulation systems in reactors having steel or zirconium structural materials.

In the operation of a nuclear reactor, failure of fuel element cladding, both small and on a large scale, is an ever present possibility. Following a fuel element failure, quantities, sometimes quite large, of fissionable material are carried by the circulating coolant or moderator and deposited throughout the liquid-containing system. Removal of these is necessary not only because of the radioactive and toxic nature of the fissionable material itself but even more because of the highly radioactive fission products which are embedded within it.

The task of decontaminating the coolant or moderator system is complicated by the chemical complexity of the materials requiring removal. When the fuel is an actinide metal, and where the temperature of the water is high as in the case of pressurized water-cooled reactors, the contaminating material is usually in the form of a mixture of actinide oxides such as $UO_2$, $U_3O_8$, $UO_3$, $PuO_2$, and the like, and often included are particulate pieces of actinide metal, sometimes of considerable size.

An especially difficult decontamination situation arises when plutonium dioxide is involved. This oxide and the other oxides of plutonium are notoriously hard to dissolve, and resist nitric acid almost completely. Finally, decontaminating solutions must not corrode the structural metal of the coolant circulation system to an unacceptable extent.

In the past, nitric acid has been used as a decontaminant; in addition to its inability to dissolve $PuO_2$ this decontaminant is unacceptably corrosive to carbon steel and to brass alloys. Mixtures of phosphoric acid and hydrogen peroxide have been used, but have been found to be severely corrosive. Solutions containing permanganate ion have been tried, but these tend to leave deposits of manganese dioxide which are difficult to remove completely. Many other solutions have been proposed but all have had some drawback; either they dissolved the oxides in question but not the metal, or they dissolved the metal but not the oxide, or else their corrosion characteristics made them impractical.

It is, accordingly, the general object of the invention to provide an effective, practical method of decontaminating nuclear reactor liquid-containing systems.

It is a more particular object to provide such a method for a nuclear reactor liquid-containing system which is contaminated with a mixture of actinide oxides, actinide metal and fission products.

It is a concurrent object of the invention to provide a decontaminating solution capable of dissolving a mixture of actinide oxides, actinide metal and fission products.

Other objects will appear as the description proceeds.

The foregoing objects are attained by decontaminating a reactor liquid-containing system with a five component aqueous solution, the first four components of which are oxalic acid, sodium oxalate, hydrogen peroxide and 8-quinolinol. An example of these first four components is as follows:

(1) Oxalic acid, about 2.3 grams per liter
(2) Sodium oxalate, about 32 grams per liter
(3) Hydrogen peroxide, about 15 grams per liter
(4) 8-quinolinol, about 1 gram per liter It is to be understood that the term "per liter" refers to a liter of the entire solution including the fifth component now to be described.

The fifth component is a member of the class consisting of 40% by weight aqueous peracetic acid, and a 2 to 1 by weight mixture of sodium gluconate and 50% by weight aqueous gluconic acid.

When the fifth component is the aqueous peracetic acid, it may be present in the solution at the rate of about 12.5 grams per liter of solution.

When the fifth component of the solution is the mixture above referred to the components of the mixture may be present in the solution as follows:

Sodium gluconate, 5 to 40 grams per liter,
Gluconic acid (aq. 50%), 2.5 to 20 grams per liter, the term "liter" again being understood to be a liter of the entire solution, and the 2 to 1 by weight ratio above mentioned always being observed.

This solution, regardless of which of the two fifth components is chosen, is effective in decontaminating reactor liquid-containing systems, and is well within the limits of acceptable corrosive action in the case of systems containing carbon steel, stainless steel, Inconel, zirconium and brass. The solution has certain advantages depending on which of the two fifth components is chosen, as will be seen in the examples later on.

To use the decontaminating solution, the coolant or moderator water, which, of course, may be either light or heavy water, is emptied from the contaminated system. The decontaminating solution is then put into the system in an amount approximately equal to the normal amount of coolant or moderator and the circulation means such as a pump is turned on. The withdrawn coolant or moderator is analyzed to determine its degree of contamination; this is done most readily and accurately by counting its radioactivity in a disintegration counter. From time to time portions of the decontaminating solution are withdrawn, fresh portions put in, and the withdrawn portions are counted for radioactivity. When the count of a withdrawn portion reaches a safe level the decontaminating solution is withdrawn completely and the system is flushed with light water a sufficient number of times to remove all traces of the solution. If the coolant or moderator is heavy water, the system is flushed additionally with heavy water a sufficient number of times to remove all traces of the light water.

EXAMPLE I

A decontaminating solution was made up as follows, it being understood that the term "liter" refers in all cases to a liter of the entire solution and that the peracetic acid is aqueously dilute, its percentage indicated being by weight based on the weight of the dilute acid:

| | Grams/liter |
|---|---|
| Oxalic acid | 2.3 |
| Sodium oxalate | 32.0 |
| Hydrogen peroxide | 15.0 |
| 8-quinolinol | 1.0 |
| Peracetic acid (40%) | 12.5 |

Six portions of the solution were taken out and placed in glass flasks. A mixture of uranium oxides were placed in the flasks in three different proportions, 25, 50 and 75 grams per liter of solution. The flasks were connected to reflux condensers and maintained at three different temperatures, 80° C., 60° C., and 40° C., for one hour in each case. Initial and final pH's of each flask were taken, and the grams of dissolved uranium per liter of solution were determined for each flask at the end of the hour. The results of these tests are set forth in Table I:

to make it a superior decontamination means for nuclear reactor liquid-containing systems, and that at the same time its rate of corrosion is acceptable for steel, stainless steel, zirconium alloys and brasses.

EXAMPLE II

A decontaminating solution was made up as follows, it again being understood that the term "liter" refers in all cases to a liter of the entire solution and that the

*Table I*

DATA FOR DISSOLUTION OF URANIUM OXIDES WITH THE OXALIC-PEROXIDE-PERACETIC SOLUTION

| Amount of Oxides Added to Solution | | | | | | | | | Temp., °C. |
|---|---|---|---|---|---|---|---|---|---|
| 25 g./l. | | | 50 g./l. | | | 75 g./l. | | | |
| Initial pH | Final pH | Gms. U per Liter in Solution | Initial pH | Final pH | Gms. U per Liter in Solution | Initial pH | Final pH | Gms. U per Liter in Solution | |
| 4.12 | 4.32 | 16.9 | 4.30 | 4.50 | 19.8 | (¹) | (¹) | (¹) | 80 |
| 4.30 | 4.53 | 16.6 | (¹) | (¹) | (¹) | (¹) | (¹) | (¹) | 60 |
| 4.30 | 4.51 | 15.1 | 4.30 | 4.52 | 23.9 | 4.38 | 4.57 | 24.2 | 40 |

¹ Tests not conducted.

20 more portions of the same decontaminating solution were taken, and into each was placed a weighed metal coupon, of one of the following metals: ordinary or "carbon" steel (CS); 304 stainless steel (304 SS); 302 stainless steel (302 SS); Inconel-X; Zircaloy; common, or as it is also known, red brass; and admiralty brass, or as it is also known, admiralty metal. These portions were maintained at three different temperatures, 80° C., 60° C. and 40° C., and after a period of time the coupons were removed, rinsed, dried, weighed, and their corrosion rates in mils per hour calculated from the loss of weight of the coupons in the usual manner. The results of these tests are set forth in Table II.

gluconic acid is aqueously dilute, its percentage indicated being by weight based on the weight of the dilute acid:

| | Grams/liter |
|---|---|
| Oxalic acid | 2.3 |
| Sodium oxalate | 32.0 |
| Hydrogen peroxide | 15.0 |
| 8-quinolinol | 1.0 |
| Sodium gluconate | 10.0 |
| Gluconic acid (50%) | 5.0 |

This solution was subjected to the same tests as those described in Example I, with a few minor variations,

*Table II*

CORROSION (MILS/HOUR) OF MATERIALS IN THE OXALIC-PEROXIDE-PERACETIC SOLUTION

| Materials | | | | | | | Temp., °C. |
|---|---|---|---|---|---|---|---|
| CS | 304 SS | 302 SS | Inconel-X | Zircaloy | Brass | Admiralty Brass | |
| 0.01 | 0.001 | 0.001 | 0.001 | ¹ N.D. | 5.34 | 3.96 | 80 |
| 0.002 | N.D. | 0.001 | N.D. | N.D. | 2.27 | 1.91 | 60 |
| 0.001 | N.D. | N.D. | N.D. | N.D. | | 0.74 | 40 |

¹ N.D.=none detected.

The above two series of tests indicate that the decontaminating solution with peracetic acid as the fifth component dissolves uranium oxides to an extent sufficient which are indicated in Tables III and IV, below, which set out the results of the tests in the same manner as Tables I and II.

*Table III*

DATA FOR DISSOLUTION OF URANIUM OXIDES WITH THE OXALIC-PEROXIDE-GLUCONIC SOLUTION

| Temp. | Amount of Oxides Added to Solution | | | | | | | | |
|---|---|---|---|---|---|---|---|---|---|
| | 25 g./l. | | | 50 g./l. | | | 75 g./l. | | |
| | Initial pH | Final pH | Gms. U per Liter in Solution | Initial pH | Final pH | Gms. U per Liter in Solution | Initial pH | Final pH | Gms. U per Liter in Solution |
| 80° C. | 4.4 | 4.8 | 16.4 | 4.4 | 4.8 | 33.6 | (¹) | (¹) | (¹) |
| 60° C. | 4.4 | 4.8 | 17.8 | (¹) | (¹) | (¹) | (¹) | (¹) | (¹) |
| 40° C. | 4.4 | 4.8 | 14.9 | 4.4 | 4.8 | 29.7 | 4.6 | 4.9 | 36.3 |
| 25° C. | (¹) | (¹) | (¹) | (¹) | (¹) | 24.0 | (¹) | (¹) | (¹) |

¹ Tests not conducted.

Table IV
CORROSION (MILS/HOUR) OF MATERIALS IN THE OXALIC-PEROXIDE-GLUCONIC SOLUTION

| Temp. | Materials | | | | | | |
|---|---|---|---|---|---|---|---|
| | CS | 304 SS | 302 SS | Inconel-X | Zircaloy-2 | Brass | Admiralty Brass |
| 80° C | <0.005 | N.D. | 0.001 | <0.001 | [1] N.D. | 1.72 | 1.69 |
| 60° C | <0.002 | N.D. | <0.001 | N.D. | N.D. | 0.77 | 0.62 |
| 40° C | >0.001 | N.D. | N.D. | N.D. | N.D. | | 0.12 |

[1] N.D.=none detected.

These tests indicate that my decontaminating solution with the fifth component in this example is likewise an efficient means of dissolving uranium oxides, with desirably low corrosion characteristics. It has the additional advantage of not being susceptible to explosion.

EXAMPLE III

The decontaminating solution of Example I was used in a simulated test of decontaminating a contaminated light water core-coolant circulation system of a nuclear reactor having fuel elements of $PuO_2$. Irradiated $PuO_2$ from a reactor core and light water were placed in a shielded cask and attached to a loop of pipe having a circulating pump, a system in inlet and outlet valves, and a filter.

The system, consisting of the cask and the loop, was maintained at 300° C., and after one hour the water was drained from the system through the filter and the filter was counted for radioactivity. It was found to be 22 roentgens per hour.

The decontaminating solution described in Example I was then circulated through the system for one hour at 80° C. The solution was drained from the system and the system was then flushed twice with water and the radioactivity in the filter was counted. It was found to be 8.2 roentgens per hour, or a reduction of about 63 percent.

The system was then filled with the decontaminating solution of Example II and the same steps were carried out as just described, under the same conditions. The resulting radioactivity on the filter was found to be 5.5 roentgens per hour, or a reduction of about 33 percent.

This example shows that my solution is an efficacious means for decontaminating nuclear reactor liquid-containing systems, regardless of which of the two fifth components is chosen. The disparity between the percentages of reduction of radioactivity, 63% and 33%, is not, of course, an accurate reflection of the comparative efficiencies of the two variations of the solution since the concentration of radioactive material was much larger at the start of the test, and under the Mass Action Law a larger reduction of radioactivity at the start was only to be expected.

EXAMPLE IV

In order to evaluate the capabilities of my decontamination solution when the concentration was varied of the fifth component of the sodium gluconate-gluconic acid type, a further series of dissolution tests was made. In these tests the temperature was held constant at 40° C., the initial number of grams of U per liter of solution at 50 and the time at one hour. The sodium gluconate was varied from 5 to 40 grams per liter of solution and the 50% gluconic acid was varied from 2.5 to 20 g./l., the 2 to 1 ratio by weight between these in all cases being observed. In all other respects these tests were carried out under the same conditions as described in previous Examples I and II.

Table V shows the gluconic acid and sodium gluconate concentrations as the fifth component of my solution in each test, and in the right hand column the number of grams of uranium dissolved per liter at the end of the hour for the solution on the same horizontal line.

Table V
EFFECT OF VARYING THE GLUCONIC ACID-SODIUM GLUCONATE CONCENTRATION AT 40° C.

| Gluconic Acid [1] Concentration (g./l.) | Sodium Gluconate Concentration (g./l.) | Grams U/Liter in Solution |
|---|---|---|
| 2.5 | 5.0 | 29.0 |
| 5.0 | 10.0 | 29.7 |
| 10.0 | 20.0 | 24.4 |
| 20.0 | 40.0 | 27.3 |

[1] Gluconic acid (50%).

The above data indicates that the concentrations of sodium gluconate and gluconic acid may be varied within the limits tested without changing the dissolution capabilities of the solution.

It will be understood that the invention is not to be limited to the details given herein but that it may be modified within the scope of the appended claims.

The embodiments of the invention in which an exclusive property or privilege is claimed are defined as follows:

1. An aqueous decontaminating solution consisting of oxalic acid, sodium oxalate, hydrogen peroxide, 8-quinolinol, and a member of the class consisting of aqueous peracetic acid and a 2 to 1 by weight mixture of sodium gluconate and 50 percent by weight aqueous gluconic acid, the components of said solution being present in amounts sufficient to decontaminate an aqueous coolant system of a nuclear reactor.

2. An aqueous decontaminating solution consisting essentially of about 2.3 grams per liter of oxalic acid, about 32 grams per liter of sodium oxalate, about 15 grams per liter of hydrogen peroxide, about 1 gram per liter of 8-quinolinol, and a member of the class consisting of 40 percent by weight of aqueous peracetic acid present in the proportions of 12.5 grams per liter, and a 2 to 1 by weight mixture of sodium gluconate and 50 percent by weight of aqueous gluconic acid, the said sodium gluconate being present in the proportions of from about 5 to about 40 grams per liter and the said aqueous gluconic acid being present in the proportions of from about 2.5 to about 20 grams per liter.

3. An aqueous decontaminating solution consisting essentially of about 2.3 grams per liter of oxalic acid, about 32 grams per liter of sodium oxalate, about 15 grams per liter of hydrogen peroxide, about 1 gram per liter of 8-quinolinol, and about 12.5 grams per liter of 40 percent by weight of aqueous peracetic acid.

4. An aqueous decontaminating solution consisting essentially of about 2.3 grams per liter of oxalic acid, about 32 grams per liter of hydrogen peroxide, about 1 gram per liter of 8-quinolinol, about 10 grams per liter of sodium gluconate and about 5 grams per liter of 50 percent by weight of aqueous gluconic acid.

5. A method of decontaminating a fluid-containing system of a nuclear reactor, comprising contacting the system with an aqueous decontaminating solution consisting essentially of about 2.3 grams per liter of oxalic acid, about 32 grams per liter of sodium oxalate, about 15 grams per liter of hydrogen peroxide, about 1 gram per liter of 8-quinolinol, and a member of the class consisting of 40 percent by weight of aqueous peracetic acid present in the proportions of 12.5 grams per liter, and a 2 to 1 by weight mixture of sodium gluconate and 50 percent by weight of aqueous gluconic acid, the said sodium gluconate being present in the proportions of from about 5 to about 40 grams per liter and the said aqueous gluconic acid being present in the proportions of from about 2.5 to about 20 grams per liter.

6. A method of decontaminating a fluid-containing system of a nuclear reactor, comprising contacting the system with an aqueous decontaminating solution consisting essentially of about 2.3 grams per liter of oxalic acid, about 32 grams per liter of sodium oxalate, about 15 grams per liter of hydrogen peroxide, about 1 gram per liter of 8-quinolinol, and about 12.5 grams per liter of 40 percent by weight of aqueous peracetic acid.

7. A method of decontaminating a fluid-containing system of a nuclear reactor, comprising contacting the system with an aqueous decontaminating solution consisting essentially of about 2.3 grams per liter of oxalic acid, about 32 grams per liter of hydrogen peroxide, about 1 gram per liter of 8-quinolinol, about 10 grams per liter of sodium gluconate, and about 5 grams per liter of 50 percent by weight of aqueous gluconic acid.

References Cited by the Examiner

AEC Document HW–67937, Decontamination Studies for Hapo Water-Cooled Reactor Systems, Dec. 27, 1960, pages 22–38.

LEON D. ROSDOL, *Primary Examiner.*

S. TRAUB, *Assistant Examiner.*